US010084550B2

(12) United States Patent
Lee et al.

(10) Patent No.: US 10,084,550 B2
(45) Date of Patent: *Sep. 25, 2018

(54) METHODS AND SYSTEMS FOR COMMUNICATIVELY COUPLING VEHICLES AND GROUND SYSTEMS

(71) Applicant: The Boeing Company, Chicago, IL (US)

(72) Inventors: Donald B. Lee, Shoreline, WA (US); Brian Edward Ward, Kent, WA (US); Timothy M. Mitchell, Seattle, WA (US)

(73) Assignee: The Boeing Company, Chicago, IL (US)

(*) Notice: Subject to any disclaimer, the term of this patent is extended or adjusted under 35 U.S.C. 154(b) by 84 days.

This patent is subject to a terminal disclaimer.

(21) Appl. No.: 15/185,264

(22) Filed: Jun. 17, 2016

(65) Prior Publication Data
US 2016/0301481 A1 Oct. 13, 2016

Related U.S. Application Data

(63) Continuation-in-part of application No. 13/968,761, filed on Aug. 16, 2013, now Pat. No. 9,436,569.

(51) Int. Cl.
H04B 10/80 (2013.01)
H04B 10/25 (2013.01)
(Continued)

(52) U.S. Cl.
CPC ......... *H04B 10/807* (2013.01); *G02B 6/3817* (2013.01); *G06F 1/32* (2013.01);
(Continued)

(58) Field of Classification Search
CPC .. H04B 10/807; H04B 10/2504; H04B 10/03; H04L 12/10; G02B 6/3817; G06F 1/32
See application file for complete search history.

(56) References Cited

U.S. PATENT DOCUMENTS 3,914,015 A 10/1975 McCartney
4,158,478 A * 6/1979 D'Auria ................ G02B 6/441
174/70 R
(Continued)

FOREIGN PATENT DOCUMENTS

EP 0203249 A2 12/1986
EP 1363294 A2 11/2003
(Continued)

OTHER PUBLICATIONS

Great Britain Combined Search and Examination Report dated Feb. 1, 2016 for related application GB1514596.4; 6 pp.
(Continued)

*Primary Examiner* — Russell Warren Frejd
(74) *Attorney, Agent, or Firm* — Armstrong Teasdale LLP

(57) ABSTRACT

A vehicle that includes an onboard connector including a conductive portion and an optical communication portion. The vehicle further includes an optical interface coupled in communication with the onboard connector and onboard systems of the vehicle. The optical interface is configured to at least one of receive or transmit optical signals via the optical communication portion. When a ground-system connector is connected to the onboard connector, data included in the optical signals is communicated between the ground system connector and the onboard systems of the vehicle.

15 Claims, 5 Drawing Sheets

(51) Int. Cl.
*H04B 10/03* (2013.01)
*H04L 12/10* (2006.01)
*G02B 6/38* (2006.01)
*G06F 1/32* (2006.01)

(52) U.S. Cl.
CPC ......... *H04B 10/03* (2013.01); *H04B 10/2504* (2013.01); *H04L 12/10* (2013.01)

(56) References Cited

U.S. PATENT DOCUMENTS

| | | |
|---|---|---|
| 4,568,145 A | 2/1986 | Colin et al. |
| 4,695,127 A * | 9/1987 | Ohlhaber ............... G02B 6/443 174/70 R |
| 4,867,527 A * | 9/1989 | Dotti ................... G02B 6/4416 385/101 |
| 4,895,426 A | 1/1990 | Pinson |
| 4,896,939 A | 1/1990 | O'Brien |
| 5,048,914 A | 9/1991 | Sneddon |
| 5,140,659 A | 8/1992 | Minds et al. |
| 5,574,815 A | 11/1996 | Kneeland |
| 6,533,466 B1 | 3/2003 | Smith |
| 7,362,936 B2 | 4/2008 | Stark et al. |
| 7,515,797 B2 | 4/2009 | Stark et al. |
| 7,515,798 B2 | 4/2009 | Stark et al. |
| 7,523,889 B2 | 4/2009 | Bourjac et al. |
| 7,802,724 B1 | 9/2010 | Nohr |
| 7,965,480 B2 | 6/2011 | Crawley et al. |
| 2003/0215197 A1 | 11/2003 | Simon et al. |
| 2004/0004130 A1 | 1/2004 | Rotta |
| 2007/0058907 A1 | 3/2007 | Mynott et al. |
| 2010/0319956 A1 | 12/2010 | Ballard et al. |
| 2013/0201316 A1 | 8/2013 | Binder et al. |

FOREIGN PATENT DOCUMENTS

| | | |
|---|---|---|
| EP | 2111691 B1 | 1/2011 |
| EP | 2445119 A1 | 4/2012 |
| EP | 2775629 A1 | 9/2014 |
| WO | 2008097983 A1 | 8/2008 |

OTHER PUBLICATIONS

Combined Search and Examination Report for Application No. GB1414552.8; dated Jan. 28, 2015; 8 pages.

* cited by examiner

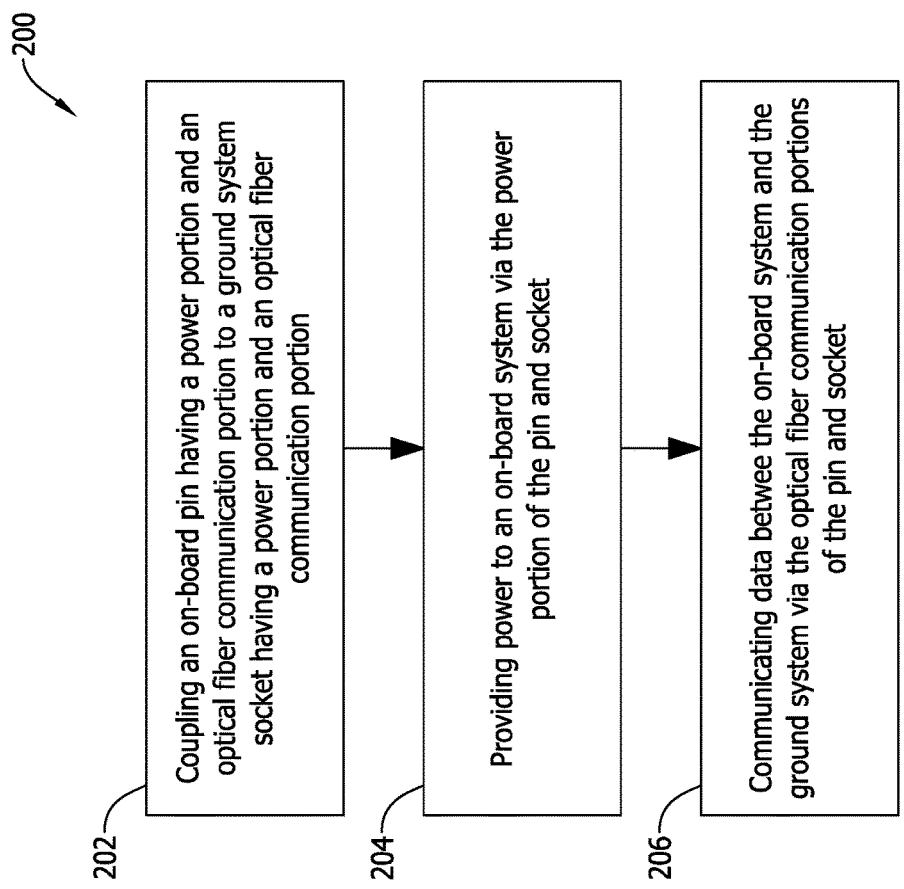

METHODS AND SYSTEMS FOR COMMUNICATIVELY COUPLING VEHICLES AND GROUND SYSTEMS

CROSS-REFERENCE TO RELATED APPLICATIONS

This application is a continuation-in-part and claims priority to U.S. patent application Ser. No. 13/968,761, filed Aug. 16, 2013 for "METHODS AND SYSTEMS FOR COMMUNICATIVELY COUPLING VEHICLES AND GROUND SYSTEMS", and now issued as U.S. Pat. No. 9,436,569, which is incorporated by reference herein in its entirety.

BACKGROUND

This present disclosure relates generally to communications between a vehicle and ground systems and, more particularly, relates to integrated power and communications interfaces.

Systems operating on-board a vehicle may generate significant amounts of data. For example, in the case of an aircraft, advanced avionics, in-flight entertainment systems, catering systems, passenger systems and other on-board systems generate and/or utilize substantial amounts of data. As just one particular example for an aircraft, significant data is generated in connection with on-board monitoring systems, such as engine monitoring systems. Engine monitoring data includes, for example, compression ratios, rotations per minute, temperature, vibration, and other engine operational data. In-flight entertainment systems also can involve significant data, e.g., terabytes of data for a suite of movies.

With some known aircraft, when the aircraft arrives at a gate, a power source is coupled to the aircraft via a power cable so that certain systems on-board the aircraft continue to function when the aircraft engines power down. Paper copies containing collected data are carried off the aircraft and delivered to the back office or forwarded to another office to be logged. Utilizing paper printouts of data creates certain challenges with respect to the physical transfer of the data from the aircraft, and subsequent analysis and processing of such data.

Rather than paper copies, and if the aircraft arrival gate is configured for electronic data download, data is downloaded from the aircraft by physically coupling an umbilical cable from a ground system to an interface on the aircraft. Such cable may be used for the dual purpose of supplying power to the aircraft on-board systems and for communications using power line communications techniques. Data is transferred via the power cable from the aircraft to the ground system.

The bandwidth for data transfer using power line communications typically is not sufficient to support all data transfer needs for the limited time an aircraft is at the gate. For example, with respect to a movie for the in-flight entertainment system, one or more movies may require a transfer of over a terabyte of data and the aircraft may only be at the gate for about twenty minutes. Rather than attempt to transfer the movie content to the in-flight entertainment system via power line communication and thereby consume most if not all the bandwidth available on the power line for transfer during the twenty minute window the aircraft is at the gate, more typically a ground crew support person manually delivers the movie to the aircraft on a storage medium (e.g., a movie prerecorded on a DVD). To make such manual transfer, the support person is scheduled to arrive at the gate at a certain time, wait for the appropriate time to board the aircraft to make the physical delivery, board the aircraft at the appropriate time, and then depart the aircraft. Coordinating the logistics for such deliveries across many different aircraft and gates can be complicated and generally time-consuming to plan and execute.

Wireless communication systems for transferring data between an aircraft and ground system also are known. With at least some such systems, when an aircraft arrives on the ground (sometimes referred to as weight on wheels, WOW), data is downloaded from a central server that resides on the aircraft to a ground system. Data may also be uploaded to such central server as well. Such communications occur, for example, using a low speed VHF based network or a wireless local area network.

Optical fibers also have been considered for use in aircraft data transfer applications. Utilizing optical fibers is attractive at least in part because such fibers have much more bandwidth as compared to at least some other known techniques. With optical fibers, however, the aircraft environment is a challenge due to potential exposure to weather as well as the environment on the ground at an aircraft gate. For example, with the activity that occurs at the gate, it is very possible that carts and other vehicles could run over the optical fibers which could damage or even break the fibers. In addition, adding a separate optical fiber connection to an aircraft generally requires significant engineering and other efforts, which can be costly. Requiring the ground crew to be trained on making an additional connection to the aircraft also requires time and investment.

Demand for additional communication channels and data transfer needs is driving rapid change in connection with such communications. Such increased demand is due, for example, to increasing reliance by ground systems upon data from the aircraft, as well as increased communication needs of the flight crew, cabin crew, and passengers. In addition, data diversity along with an increasing number of applications producing and consuming data in support of a wide range of business processes puts additional demand on communications.

BRIEF DESCRIPTION

In one aspect, a vehicle is provided. The vehicle includes an onboard connector including a conductive portion and an optical communication portion. The vehicle further includes an optical interface coupled in communication with the onboard connector and onboard systems of the vehicle. The optical interface is configured to at least one of receive or transmit optical signals via the optical communication portion. When a ground-system connector is connected to the onboard connector, data included in the optical signals is communicated between the ground system connector and the onboard systems of the vehicle.

BRIEF DESCRIPTION OF THE DRAWINGS

FIG. 5 is an exemplary flow diagram of a method of communicating data between a vehicle and a ground system.

DETAILED DESCRIPTION

The systems and methods described herein are sometimes described in the context of an airplane. Such systems and methods, however, are not limited to practice in connection with just airplanes and can be used in connection with any vehicle. As used herein, the term vehicle refers to any object capable of mobility, including aircraft, automobiles, ships, tanks, trucks, and locomotives. As used herein, the term aircraft refers to airplanes, helicopters, missiles, and any object capable of flight. Furthermore, the terms "data", "message", and "file" are sometimes used herein interchangeably, and each of those terms broadly refer to information in any format.

Also, communication between an aircraft and ground system sometimes is referred to herein as Aircraft/Ground Systems Communication (AGSC). AGSC generally is bidirectional between the aircraft and ground systems. In one aspect, the systems and methods described herein facilitate communications between an aircraft and ground system upon arrival of the aircraft at a gate.

Generally, the integrated power and communications connector described herein facilitates providing power to vehicle on-board systems and communicating with such systems without requiring an additional interface/connector on the vehicle itself. More specifically, existing power connectors mounted to aircraft can be utilized for the power delivery and communications described herein. The benefits of a physical connection between the on-board systems and the ground system therefore can be achieved without the added cost and complexity associated with adding another physical connector to the vehicle. For example, the ground crew need not make an extra connection between the aircraft and ground system in utilizing the current system.

The present integrated power and communications systems and methods also can be modified and utilized in combination with known power and communications systems and methods. For example, it is contemplated that some communications can still occur via power line communications, and wireless communications also can be used. With multiple communications modalities, one modality (e.g., power line communications) can be used as a fail-over mode in the event one of the other modalities is not then operable. In addition, different modalities can be used to facilitate creating different domains for communicating, for example, commercial domain data and military domain data. As one example, the wireless domain could be used as the commercial domain, and the optical fiber domain could be used as the military domain. Of course, numerous alternatives are possible.

Figure 1:
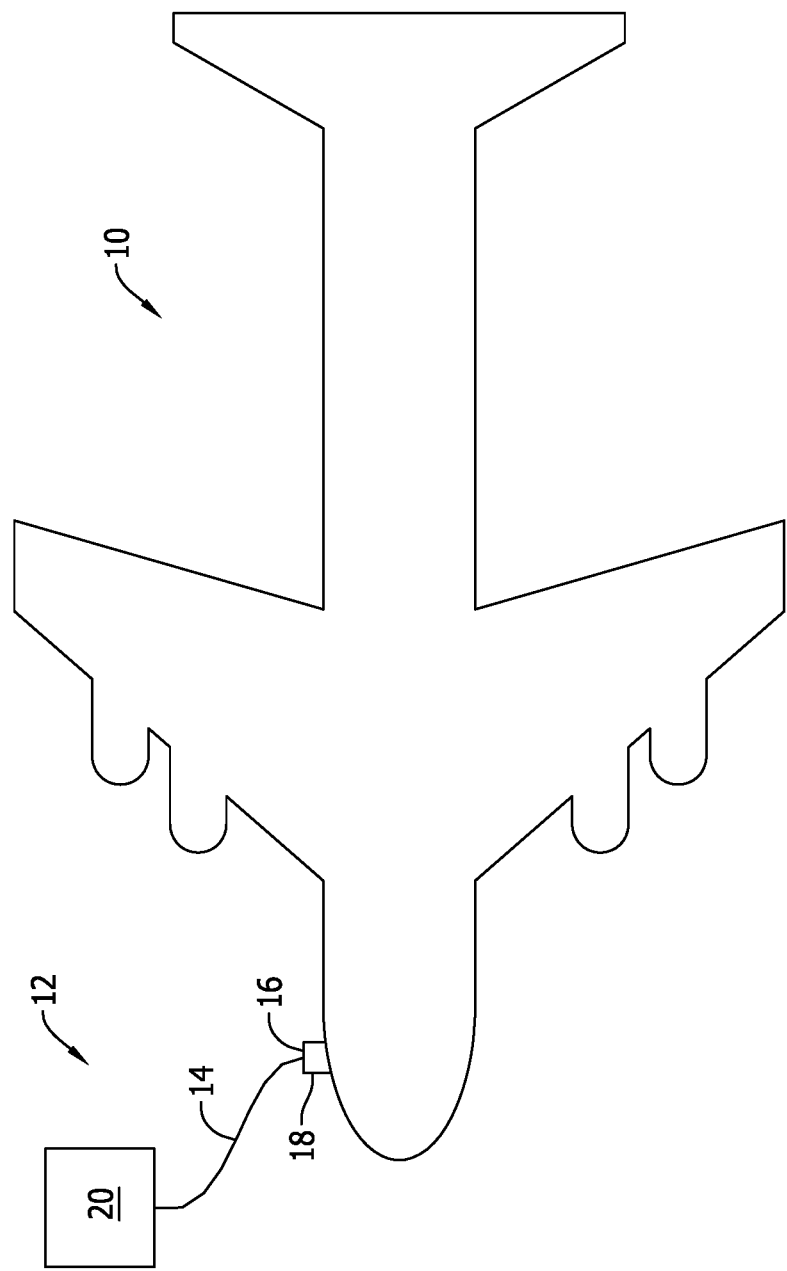
FIG. 1 is a schematic illustration of an airplane and a ground system with an integrated power and data cable.

FIG. 1 is a schematic illustration of an airplane 10 and a ground system 12 including an integrated power and data cable 14 and connector 16. Airplane 10 includes an integrated power and data connector 18 mounted so that connector 18 is accessible to ground crew personnel. Although certain ground system components are schematically illustrated as a separate box 20 in FIG. 1, such ground system components can be integrated into other physical components at an airplane gate, such as into a jetway system. Integrated cable 14 extends from other components 20 of ground system 12. Connector 16 electrically and communicatively couples with airplane connector 18.

As explained below in more detail, integrated cable 14 includes both optical fibers and power conductors. Connectors 16 and 18 also include integrated conductors and optical fibers. Data is transferred between the airplane on-board systems and certain ground system components 20 via connectors 16 and 18 and cable 14. In addition, power is supplied to the on-board systems via connectors 16 and 18 and cable 14.

Figure 2:
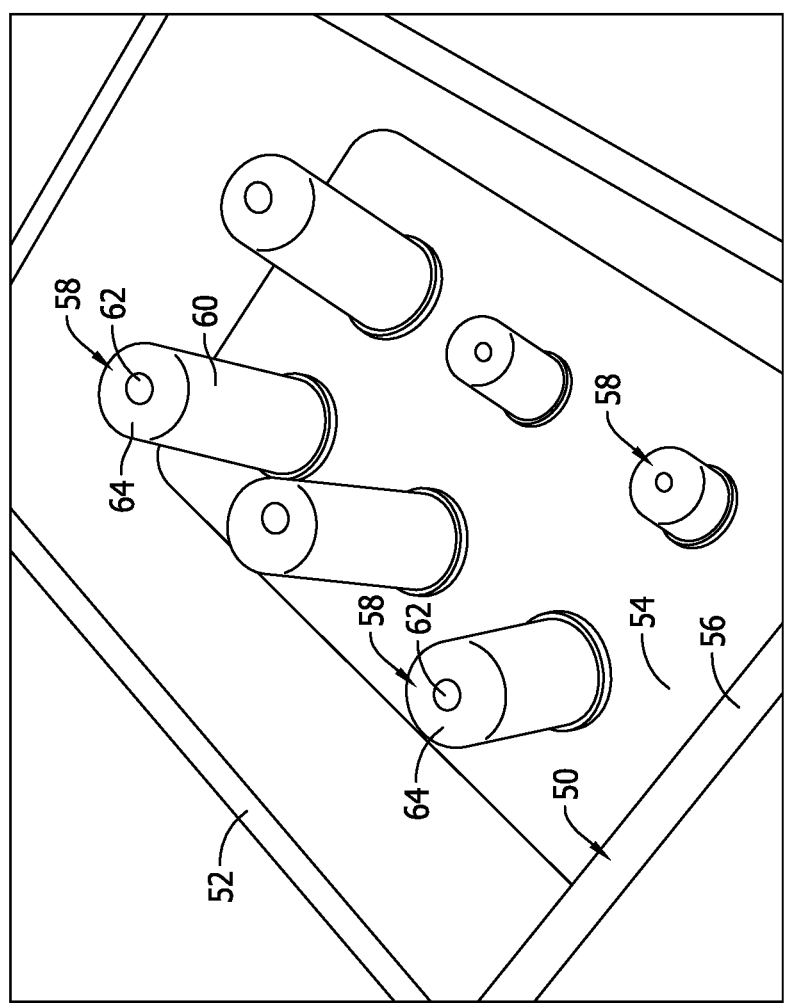
FIG. 2 is a perspective view of an integrated power and communication connector that mounts to a vehicle.

FIG. 2 is a perspective view of an integrated power and communication connector 50, which may be used as integrated connector 18 as shown in FIG. 1. Integrated power and communication connector 50 mounts to a vehicle such as airplane 10. Connector 50 includes a housing 52 having an insulated base 54 and a sidewall 56 extending around base 54. As illustrated in FIG. 2, six pins 58 extend from base 54. Each pin 58 includes an outer conductive portion 60 and an optical communication portion 62 extending within and coextensive (e.g., flush with) with an end 64 of outer conductive portion 60. Connector 50 is electrically connected to on-board systems (not shown) on the vehicle, and more particularly, each pin 58 is connected to at least one such on-board system to provide power via outer conductive portion 60 and to enable communications via optical communication portion 62.

The particular configurations for the connector can vary widely depending on the particular vehicle and on-board systems involved. Connector 50 shown in FIG. 2 is just one example connector. For example, the size and number of pins 58 can vary. The particular arrangement of pins 58 also can vary. In addition, the materials selected may depend on the particular environment in which the vehicle operates.

Figure 3:
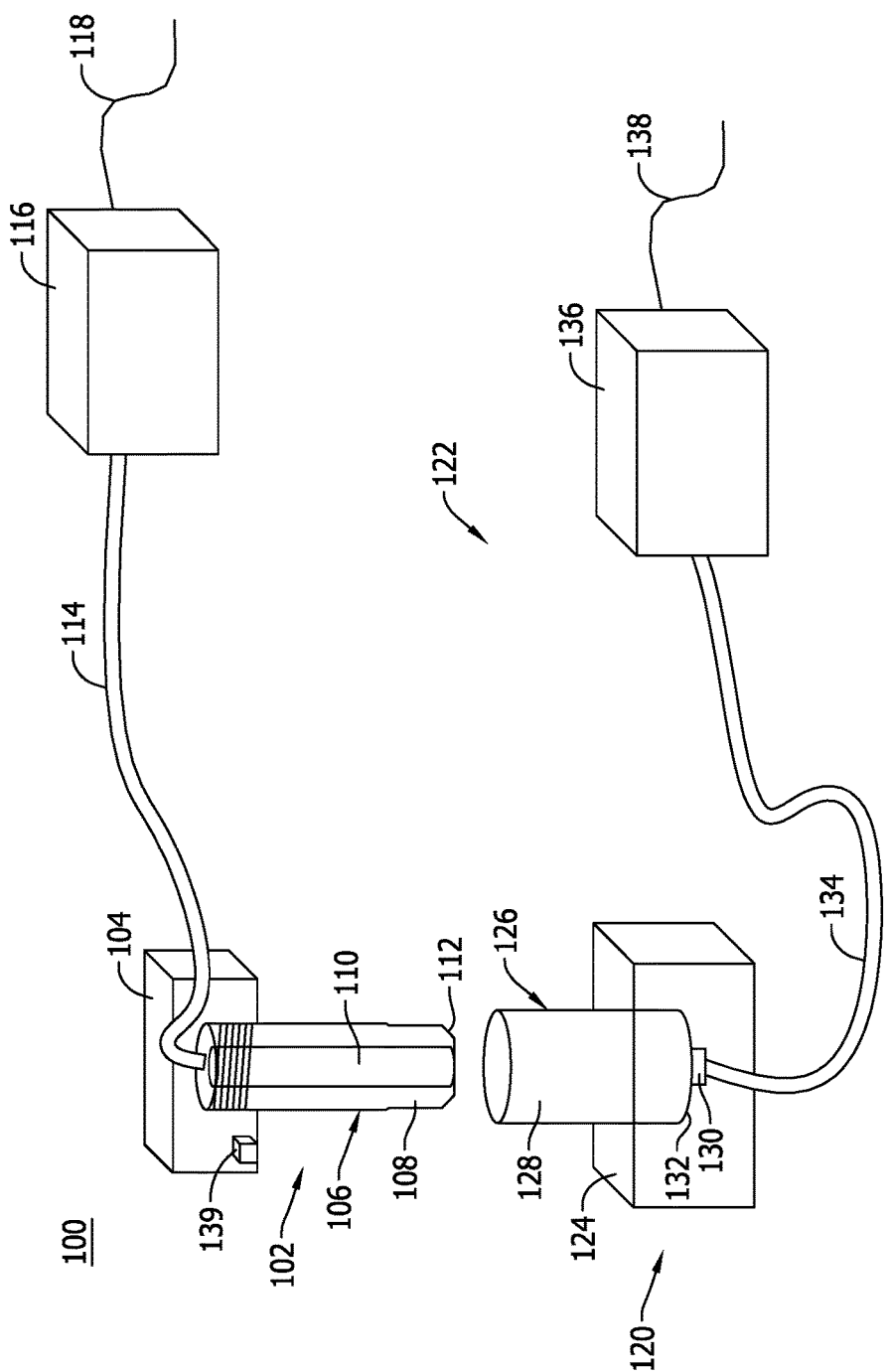
FIG. 3 is a schematic illustration of a system including a pin optical interface.

FIG. 3 is a schematic illustration of a system 100 including a pin optical interface. More specifically, system 100 includes a first integrated power and communication connector 102 that mounts to a vehicle. Connector 102 includes a housing 104, sometimes referred to as a transition block, and is schematically illustrated as having one pin 106. Pin 106 includes an outer conductive portion 108 and an optical communication portion 110 extending within and coextensive with an end 112 of outer conductive portion 108. A fiber optic cable 114 extends from optical communication portion 110 to an optical-to-Ethernet interface 116, and an Ethernet cable 118 extends from interface 116. Fiber optic cable 114, optical-to-Ethernet interface 116, and Ethernet cable 118 are carried on-board the vehicle. Ethernet cable 118 connects to on-board data generating systems so that data generated by such systems can be communicated via Ethernet cable 118 and fiber optic cable 114 to optical communication portion 110. Connector 102 is electrically connected to on-board systems (not shown) on the vehicle, and more particularly, pin 106 is connected to at least one such on-board system to provide power via outer conductive portion 108 and enable communications via optical communication portion 110.

Alternatively, connector 102 is further configured for broadband communication. For example, broadband communication may be provided over outer conductive portion 108 (i.e., broadband over powerline communication) or fiber optic cable 114. In the exemplary embodiment, a first communication path is defined by optical communication over fiber optic cable 114 (i.e., optical communication portion) and a second communication path is defined by the broadband communication. In one embodiment, optical communication and broadband communication is performed simultaneously such that the broadband communication can be used as a fail-over mode in the event optical communication is inoperable. Moreover, in one embodiment, one of the first communication path or the second communication path is a secured communication path, and the other is an unsecured communication path. An example secured communication path includes a military Supernet and STU-III telecommunication, and an example unsecured communication path includes commercial internet and regular telecommunication.

System further includes a second integrated power and communication connector 120 that forms part of a ground system 122. Connector 120 includes a housing 124, sometimes referred to as a fiber optic/electrical transition block, and is schematically illustrated as having one socket 126. Socket 126 includes a conductive portion 128 and an optical communication portion 130 at a base 132 of conductive portion 128. A fiber optic cable 134 extends from optical communication portion 130 to an optical-to-Ethernet interface 136, and an Ethernet cable 138 extends from interface 136. Fiber optic cable 134, optical-to-Ethernet interface 136, and Ethernet cable 138 form part of ground system 122.

Ethernet cable 138 connects to ground system processing components (not shown) that process and/or further communicate data collected from on-board data generating systems. More specifically, prior to operation, socket 126 is pushed over pin 106 so that pin 106 is secured within socket 126 with an interference fit. For example, a user may connect connector 120 with connector 102. Power supplied to socket 126 is transmitted through conductive portion 128 to conductive portion 108 of pin 106 and to other on-board systems. Data is transferred from on-board systems via Ethernet cable 118, interface 116 and fiber optic cable 114 to communications portion 110 illustrated as an embedded optical fiber. An optical link is established between communications portion 110 and optical communication portion 130. Data is transmitted across such link and to other ground systems components via optical cable 134, interface 136, and Ethernet cable 138. For example, the on-board system may collect data such as advanced avionics data, in-flight entertainment system data, catering system data, passenger system data, and/or engine monitoring data using a number of monitors onboard the vehicle, and transmit data to a ground system via the optical link.

In the exemplary embodiment, connector 102 and, more specifically, housing 104 includes an Ethernet connection port 139 configured for power-over-Ethernet connectivity, such as for powering a ground MODEM when aircraft power has been turned off. For example, when an Ethernet connector is connected to connector 102 at Ethernet connection port 139, power and data is transferred between the Ethernet connector and the onboard systems of airplane 10. As such, communication over fiber optic cable 114 may be utilized for other purposes, such as shrinkage and tamper protection purposes, while onboard systems of airplane 10 (i.e., the ground MODEM) are powered via Ethernet connection port 139.

Of course, many variations of system 100 are possible and contemplated. For example, the configuration and number of pins and sockets may vary. In addition, the transmission mode and format of data communications utilized by on-board systems and ground system components and may vary from system to system, and from component to component. System 100 can be modified to accommodate such formats and transmission modes.

Figure 4:
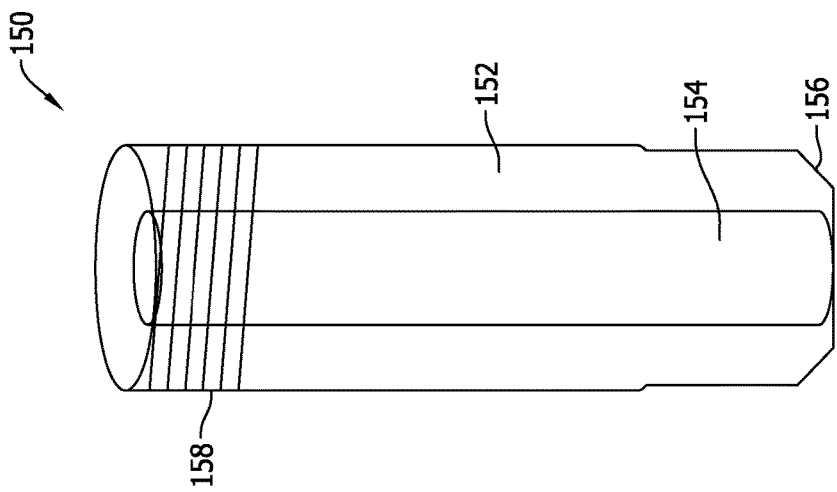
FIG. 4 is a schematic illustration of a removable pin.

FIG. 4 is a schematic illustration of a removable pin 150 that can be used in the pin-socket configurations described above. Removable pin 150 includes an outer conductive portion 152 and an optical communication portion 154 extending within and coextensive with an end 156 of outer conductive portion 152. Pin 150 also includes threads 158 to facilitate securing pin 150 within a housing (not shown) secured to a vehicle (e.g., an aircraft).

As shown in FIG. 4, pin 150 is hollow, which facilitates securing optical communication portion 154, which may be an optical fiber, within pin 150. In addition, threads 158 are configured to mate with threads in an opening in a housing secured to a vehicle so that pin 150 is readily and easily secured within the housing. In the event pin 150 is damaged or worn, pin 150 can be replaced, or removed and repaired, without having to remove the housing from the vehicle.

FIG. 5 is an exemplary flow diagram of a method 200 of communicating data between a vehicle and a ground system. Method 200 includes coupling 202 an on-board pin, such as pin 106 (shown in FIG. 3), to a ground system socket, such as socket 126 (shown in FIG. 3). The on-board pin and the ground system socket each include a power portion and an optical fiber communication portion. Power is provided 204 to an on-board system via the power portion of the pin and socket and data is communicated 206 between the on-board system and the ground system. The data is communicated 206 via the optical fiber communication portions of the pin and socket.

Various airports provide various data transfer capabilities. The above described system can be used in combination with other data transfer modalities for transferring data between on-board systems and a ground system including, for example, wireless, power line communications, as well as data transfer performed using an umbilical cable.

The term "user", as used herein, includes a human operator, as well as systems and applications. Therefore, the term user is not limited to being a human, and in many instances references a system or application that includes software operating on a processor.

Also, as used herein, the term "processor" refers to a digital processor, an analog processor, as well as any analog and digital circuit as well as software, including combinations thereof, capable of performing the described functions. For example, the processor could be a microprocessor, a computer, an analog circuit, a combination analog and digital circuit, a server (e.g., an e-mail server, a general purpose server), an integrated circuit, software, and any combination of the foregoing. Also, the described processing need not be performed by a single processor, but could be performed across more than processor.

While the present disclosure has been described in terms of various specific implementations, those skilled in the art will recognize that the present disclosure can be practiced with modification within the spirit and scope of the claims.

What is claimed is:

1. A vehicle comprising:
   an onboard connector comprising at least one pin that comprises a conductive portion and an optical communication portion; and
   an optical interface coupled in communication with said onboard connector and onboard systems of the vehicle, said optical interface configured to at least one of receive or transmit optical signals via said optical communication portion,
   wherein said at least one pin is configured to secure within a ground-system socket such that data included in the optical signals is communicated between the ground system connector and the onboard systems of the vehicle when said at least one pin is connected to said onboard connector.

2. The vehicle in accordance with claim 1, wherein the vehicle is an aircraft.

3. The vehicle in accordance with claim 1, wherein said at least one pin is threadably engaged with said onboard connector.

4. The vehicle in accordance with claim 1 further comprising an Ethernet cable coupled in communication with said optical interface, said Ethernet cable configured to transmit the data between said optical interface and the onboard systems of the vehicle.

5. The vehicle in accordance with claim 1, wherein said optical communication portion comprises an optical fiber.

6. The vehicle in accordance with claim 1, wherein said optical communication portion extends within said conductive portion.

7. The vehicle in accordance with claim 1, wherein said onboard connector is configured to receive power from the ground-based connector via said conductive portion for providing the power to the onboard systems of the vehicle.

8. The vehicle in accordance with claim 1, wherein the data communicated between the ground system connector and the onboard systems of the vehicle comprises at least one of advanced avionics data, in-flight entertainment system data, catering system data, passenger system data, and engine monitoring data.

9. The vehicle in accordance with claim 1, wherein at least one of wireless communication and power line communication occur while communicating data via said optical communication portion.

10. The vehicle in accordance with claim 9, wherein the at least one of wireless communication and power line communication are used as a fail-over mode in the event optical communication fails.

11. The vehicle in accordance with claim 1, wherein said onboard connector is further configured for broadband communication.

12. The vehicle in accordance with claim 11, wherein said onboard connector is configured for simultaneous optical communication and broadband communication.

13. The vehicle in accordance with claim 11, wherein a first communication path is defined by optical communication over said optical communication portion and a second communication path is defined by the broadband communication, wherein one of the first communication path or the second communication is a secured communication path and the other is an unsecured communication path.

14. The vehicle in accordance with claim 1, wherein said onboard connector further comprises an Ethernet connection port configured for power-over-Ethernet connectivity, wherein, when an Ethernet connector is connected to said onboard connector, power and data is transferred between the Ethernet connector and the onboard systems of the vehicle.

15. The vehicle in accordance with claim 1, wherein said pin is configured to secure within said ground-system socket with an interference fit.

* * * * *